(12) United States Patent
Saito et al.

(10) Patent No.: US 7,316,576 B2
(45) Date of Patent: Jan. 8, 2008

(54) ELECTRIC CONNECTION BOX

(75) Inventors: Kazuaki Saito, Shizuoka (JP);
Tomohiro Ikeda, Shizuoka (JP);
Shinichi Yanagihara, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/265,145

(22) Filed: Nov. 3, 2005

(65) Prior Publication Data
US 2006/0119343 A1  Jun. 8, 2006

(30) Foreign Application Priority Data
Dec. 3, 2004  (JP)  ............................ P2004-351403

(51) Int. Cl.
*H01R 12/00* (2006.01)
*H05K 1/00* (2006.01)
(52) U.S. Cl. ...................................... 439/76.2; 439/949
(58) Field of Classification Search ............... 439/76.2, 439/949; 324/117 H
See application file for complete search history.

(56) References Cited

U.S. PATENT DOCUMENTS

| | | | | |
|---|---|---|---|---|
| 5,583,429 A | * | 12/1996 | Otaka | .......................... 324/127 |
| 5,995,380 A | * | 11/1999 | Maue et al. | ................. 361/826 |
| 6,224,397 B1 | * | 5/2001 | Nakamura | .................. 439/76.2 |
| 6,515,468 B1 | * | 2/2003 | Morimoto et al. | ....... 324/117 H |
| 2005/0090154 A1 | * | 4/2005 | Ikeda et al. | .................. 439/709 |
| 2006/0030176 A1 | * | 2/2006 | Ikeda et al. | ................. 439/76.2 |

FOREIGN PATENT DOCUMENTS

| JP | 2001-66328 A | 3/2001 |
|---|---|---|
| JP | 2004-80966 A | 3/2004 |

* cited by examiner

*Primary Examiner*—Hae Moon Hyeon
(74) *Attorney, Agent, or Firm*—Sughrue Mion, Pllc.

(57) ABSTRACT

An electric connection box is mounted within an engine room of a vehicle. A bus bar and a current sensor are sequentially mounted on a lower cover, and an upper cover is joined to the lower cover to cover the bus bar and the current sensor. The current sensor is molded integrally with the upper cover. With this construction, the current sensor and the bus bar are less liable to be displaced relative to each other, and the number of the component parts, as well as time and labor required for an assembling operation, is reduced.

18 Claims, 5 Drawing Sheets

ELECTRIC CONNECTION BOX

BACKGROUND OF THE INVENTION

1. Field of the Invention

This invention relates to an electric connection box which has electrical parts mounted thereon, and is mounted on a vehicle or the like.

2. Related Art

An electric connection box and a battery are received within an engine room, for example, of an automobile in which a power source is hybridized by the addition of a motor to an engine, and the electric connection box and the battery are electrically connected together by a power cable.

The electric connection box has a generally box-like shape as a whole, and as shown in FIG. 5, a bus bar 5 of an elongate rectangular plate-like shape, a current sensor 3 (which is to be electrically connected to the bus bar 5), etc., are sequentially mounted in a fitted manner on a synthetic resin-made lower cover 1, and then a synthetic resin-made upper cover 9 is put on the lower cover to cover these parts. The lower cover 1 and the upper cover 9 are fixed or fastened together by bolts 2. Various electrical parts, including a main contactor 11, a pre-charge contactor 10 and a resistor 12, are mounted in their respective predetermined positions on the upper casing 9.

The bus bar 5 is made of an electrically-conductive metal sheet, and one end portion (in a longitudinal direction) of the bus bar 5 is bent upwardly into a generally L-shape to provide a minus-side input terminal 6a and a plus-side input terminal 6b, and the plus-side input terminal 6b passes through a central portion of a Hall element 3a provided at the current sensor 3. A minus-side output terminal 8a and a plus-side output terminal 8b are formed at the other end of the bus bar 5. Such a conventional technique is described, for example, in the following JP-A-2004-080966.

The basic constitution and measurement principle of the current sensor are disclosed in JP-A-2001-66328.

In the above electric connection box, to positively mount the electrical parts in their respective predetermined positions is extremely important for obtaining stable characteristics. Particularly when mounting the current sensor 3 on the lower cover 1, there is encountered a situation in which a center axis of the Hall element 3a of the current sensor 3 is deviated from a center axis of the plus-side input terminal 6b of the bus bar 5 due to an error in the mounting of the current sensor 3 relative to the lower cover 1 or other factor, so that a sensing performance of the current sensor 3 is degraded.

And besides, the electric connection box is mounted at a place where severe vibrations develop during the driving of an engine and the travel of the vehicle, and therefore the current sensor 3 is displaced relative to the bus bar 5 when a holding force of the lower cover 1 for holding the current sensor 3 is low. As a result, the sensing performance of the current sensor 3 is lowered, and the reliability of the product is adversely affected.

Furthermore, the current sensor 3 is formed as a part separate from the lower cover 1, and at a later stage or step, this current sensor is mounted on the lower cover 1. Therefore, the number of the component parts as well as time and labor required for the assembling operation, increases, and the achievement of a space-saving design is prevented.

SUMMARY OF THE INVENTION

This invention has been made in view of the above circumstances, and an object of the invention is to provide an electric connection box in which a current sensor can be prevented from being displaced out of position, and besides the number of component parts, as well as time and labor required for an assembling operation, can be reduced, and furthermore a space-saving design can be achieved.

The above and other objects and novel features of the present invention will become manifest from the description in the present specification and the accompanying drawings.

The above object has been achieved by the invention which is directed to an electric connection box for mounting within an engine room of a vehicle, wherein a bus bar and a current sensor are sequentially mounted on a lower cover, and an upper cover is joined to said lower cover to cover said bus bar and said current sensor; characterized in that said current sensor is molded integrally with said upper cover.

With this construction, it is not necessary to mount the current sensor on the lower cover, and the current sensor and the bus bar are less liable to be displaced relative to each other. And besides, the number of the component parts, as well as time and labor required for an assembling operation, is reduced. The structure is prevented from becoming complicated, and a dead area is less liable to be formed, so that the efficiency of utilization of a space is enhanced.

The current sensor may be set in a mold, and a resin may be injected into the mold, so that the injected resin is molded integrally with the current sensor.

The resin may be thermoplastic or thermosetting.

The lower cover may have a hook-like retaining piece portion, and the upper cover may have a lock arm for retaining engagement with the retaining piece portion, and the upper cover is joined to the lower cover by retainingly engaging the lock arm with the retaining piece portion.

With this construction, the upper cover is firmly joined to the lower cover, so that the current sensor and the bus bar are still less liable to be displaced relative to each other.

In the present invention, the current sensor is molded integrally with the upper cover, and therefore the current sensor and the bus bar are less liable to be displaced relative to each other, so that a sensing performance of the current sensor is prevented from being degraded, thereby preventing the reliability from being adversely affected.

And besides, the number of the component parts, as well as the time and labor required for the assembling operation, can be reduced, and therefore the cost can be reduced, and the structure can be prevented from becoming complicated.

Furthermore, it is not necessary to beforehand secure or form a region at which the current sensor is to be mounted, and therefore the efficiency of utilization of the space is enhanced.

According to another aspect of the invention, there is provided an electric connection box comprising:

a lower cover on which a bus bar formed of a metal plate is mounted;

a upper cover which covers the lower cover and on which a current sensor is fixed;

wherein the current sensor is fixed to the upper cover directly with a resin of which the upper cover is formed, and a bent portion formed at one end of the bus bar is inserted into a Hall element of the current sensor.

According to another aspect of the invention, there is provided a manufacturing method of an electric connection box, comprising steps of:
- setting a current sensor in a mold;
- injecting a resin into the mold;
- forming an upper cover in a state that the current sensor is provided integrally with the upper cover;
- mounting a bus bar on a lower cover; and
- joining the upper cover with the lower cover.

DETAILED DESCRIPTION OF THE PREFERRED EMBODIMENTS

A preferred embodiment of the present invention will now be described in detail with reference to the drawings.

Figure 1:
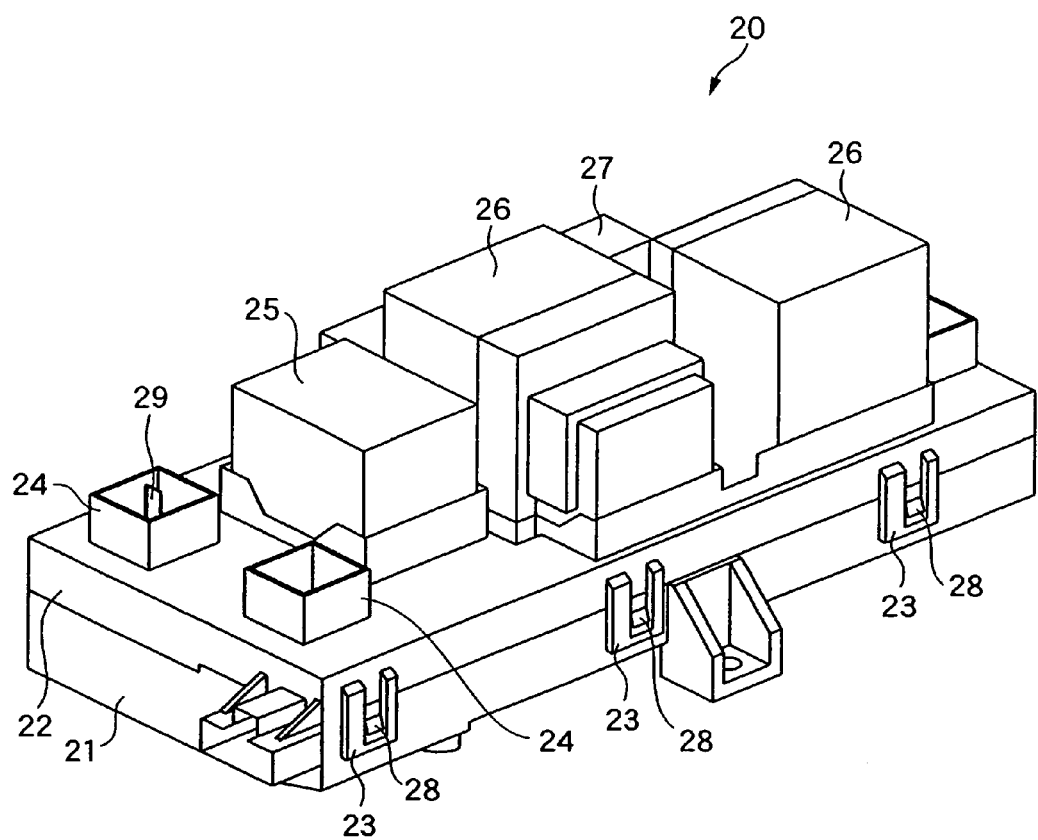
FIG. 1 is a perspective view of one preferred embodiment of an electric connection box of the present invention.

FIG. 1 is a perspective view showing one preferred embodiment of an electric connection box of the invention.

The electric connection box 20, shown in FIG. 1, is formed into a generally rectangular parallelepiped shape as a whole, and this electric connection box is mounted within an engine room having a battery (not shown) and others. The electric connection box 20 comprises a lower cover 21 and an upper cover 22 both of which are made of a synthetic resin. A receiving portion for receiving various electrical parts (described later) is formed in the inside of the electric connection box formed by the lower and upper covers 21 and 22. The electrical connection box 20 and the battery are electrically connected together by a power cable.

Figure 3:
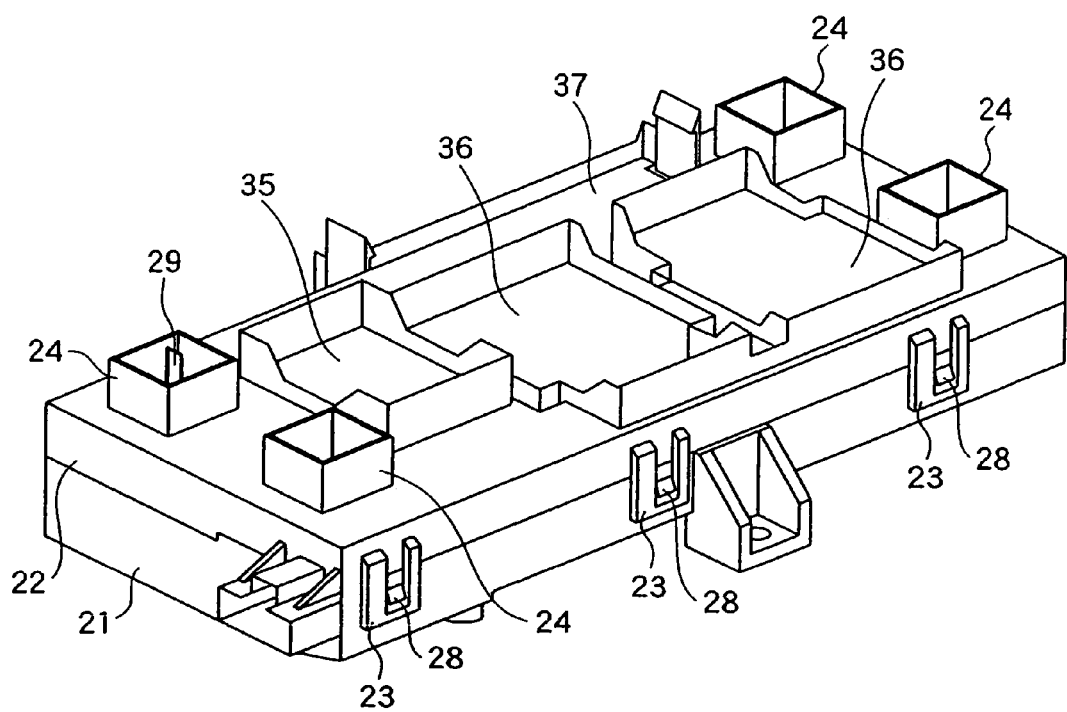
FIG. 3 is a perspective view of a portion of the electric connection box of FIG. 1.

Mounting portions 35 to 37 (see FIG. 3) for the mounting of various electrical parts thereon are beforehand secured on an upper surface of the upper cover 22, and the various electrical parts 25 to 27 such as a contactor and a resistor, are mounted on these mounting portions 35 to 37. A plurality of hook-like retaining piece portions 28 are formed on each of opposite side surfaces of the lower cover 21 (which are spaced from each other in a direction of a width thereof), and are arranged at equal intervals. A plurality of lock arms 23 for retaining engagement respectively with the retaining piece portions 28 are formed on and project downwardly from opposite side surfaces of the upper cover 22 (which are spaced from each other in a direction of a width thereof), and are so arranged as to correspond respectively to the retaining piece portions 28.

Each of the lock arm 23 is formed into a generally U-shape (that is, an upwardly-open shape). When the upper cover 22 is put on the lower cover 21 to cover the upper side thereof, the lock arms 23 are retainingly engaged with the retaining piece portions 28, respectively, thereby positioning the upper cover 22 relative to the lower cover 21 in a fixed manner. The lock arm 23 itself has elasticity, and can be elastically deformed against its resiliency so as to be brought into and out of retaining engagement with the corresponding retaining piece portion. A plurality of hollow connector portions 24 of a square cross-section are formed at opposite end portions (in a longitudinal direction) of the upper cover 22, and extend through the upper cover in an upward-downward direction.

Figure 2:
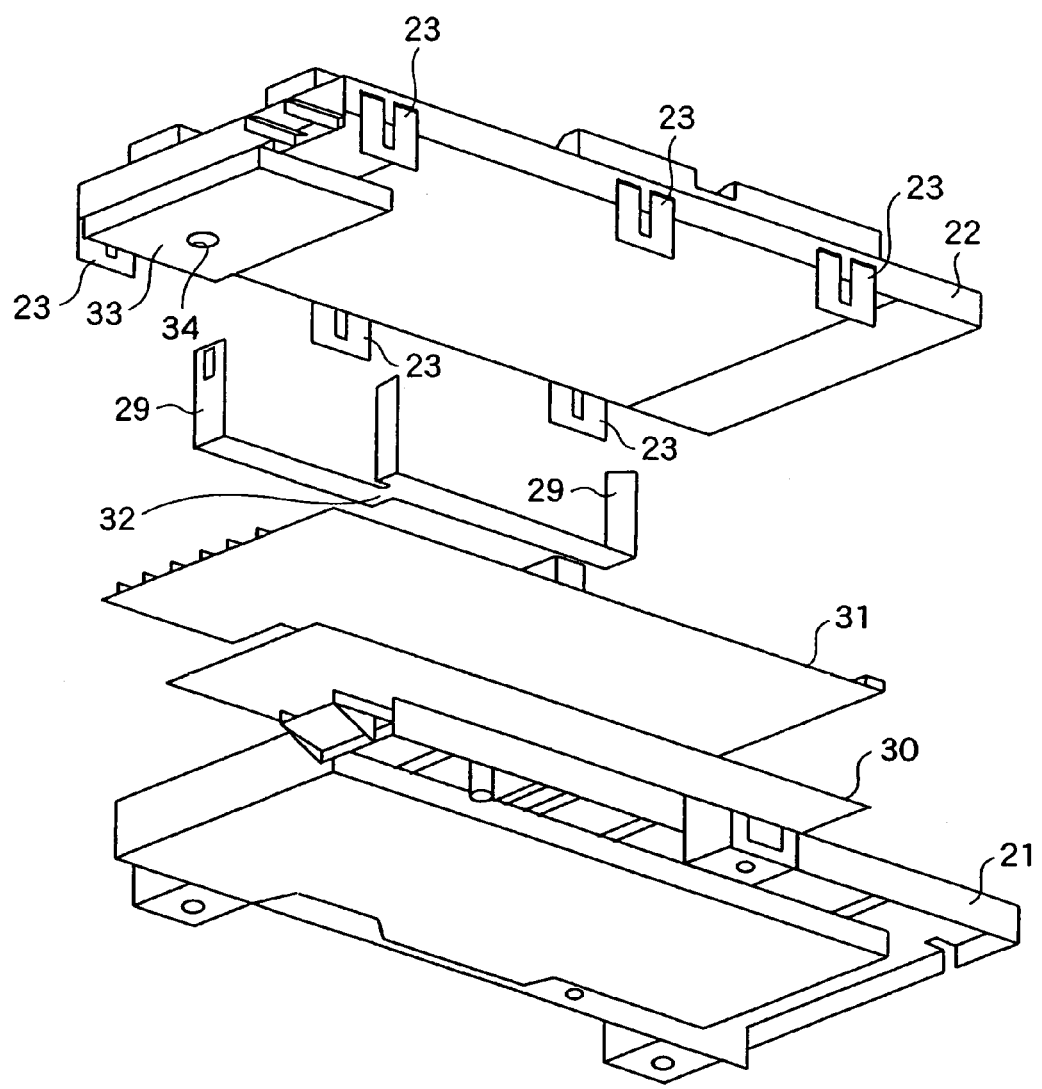
FIG. 2 is an exploded, perspective view of an important portion of the electric connection box of FIG. 1.

As shown in FIG. 2, an ECU board 30, a middle cover 31, a bus bar 32 and a current sensor 33 are mounted in the receiving portion formed by the lower cover 21 and the upper cover 22.

Namely, as shown in FIG. 2, the ECU board 30, the middle cover 31 and the bus bar 32 are sequentially mounted on the lower cover 21, and the current sensor 33 is disposed above the bus bar 32. The current sensor 33 has a Hall element 34 extending through a generally-central portion thereof in a direction of a thickness thereof, the Hall element 34 being disposed coaxially with one connector portion 24.

The bus bar 32 is formed by an elongate generally-rectangular metal sheet having electrical conductivity. Bent portions 9 of a generally L-shape are formed at opposite end portions (in a longitudinal direction) of this bus bar, and one of the bent portions 9 is passed through a center portion of the Hall element 34 of the current sensor 33 and a center portion of the connector portion 24.

The current sensor 33 is disposed on a reverse side of the upper cover 22, and is formed integrally with the upper cover 22. Namely, the current sensor 33 is set in a mold, and then a thermoplastic resin or a thermosetting resin is injected into the mold, so that the current sensor 33 is molded integrally on the reverse side of the upper cover 22. A resin molding material, having insulating and heat-resistant properties (such for example as an epoxy resin) is used as the above resin.

The electric connection box 20 of this embodiment is assembled according to the following procedure.

First, the lower cover 21 is prepared, and the ECU board 30, the middle cover 31 and the bus bar 32 are sequentially mounted on the lower cover 21 in a fitted manner. Then, the upper cover 22 is located to cover the ECU board 30, the middle cover 31 and the bus bar 32, and thereafter the lock arms 23 of the upper cover 22 are retainingly engaged with the retaining piece portions 28 of the lower cover 21, respectively, thereby positioning the upper cover 22 relative to the lower cover 21 in a fixed manner. At this time, the bent portion 29 of the bus bar 32 is aligned with the center axis of the Hall element 34 of the current sensor 33, and is passed through the Hall element 34 and the connector portion 24.

In the electric connection box of this embodiment, the current sensor 33 is formed integrally with the upper cover 22 as described above, and therefore an operation for mounting the current sensor 33 is easy. And besides, the number of the component parts is reduced, and time and labor, required for the assembling operation, can be reduced, and the structure can be prevented from becoming complicated, so that the cost can be reduced.

Furthermore, it is not necessary to beforehand secure or form a region at which the current sensor 33 is to be mounted, and therefore a dead space is less liable to be formed, and the efficiency of utilization of the space within the electric connection box 20 is enhanced.

Furthermore, the center axis of the Hall element 34 of the current sensor 33 and the center axis of the bent portion 29 of the bus bar 32 are less liable to be displaced with respect to each other, and therefore a sensing performance of the current sensor 33 is prevented from being degraded, so that the electric connection box 20 of high reliability can be obtained.

Furthermore, the upper cover 22 is firmly joined to the lower cover 21 by a fixing mechanism comprising the lock arms 23 and the retaining piece portions 28, and therefore the displacement of the current sensor 33 and the bus bar 32 relative to each other is less liable to occur.

The preferred embodiment of the invention has been described above, but the invention is not limited to the above embodiment. Various modifications in the design can be made without departing from the spirits of the invention as defined in the appended claims.

Figure 4:
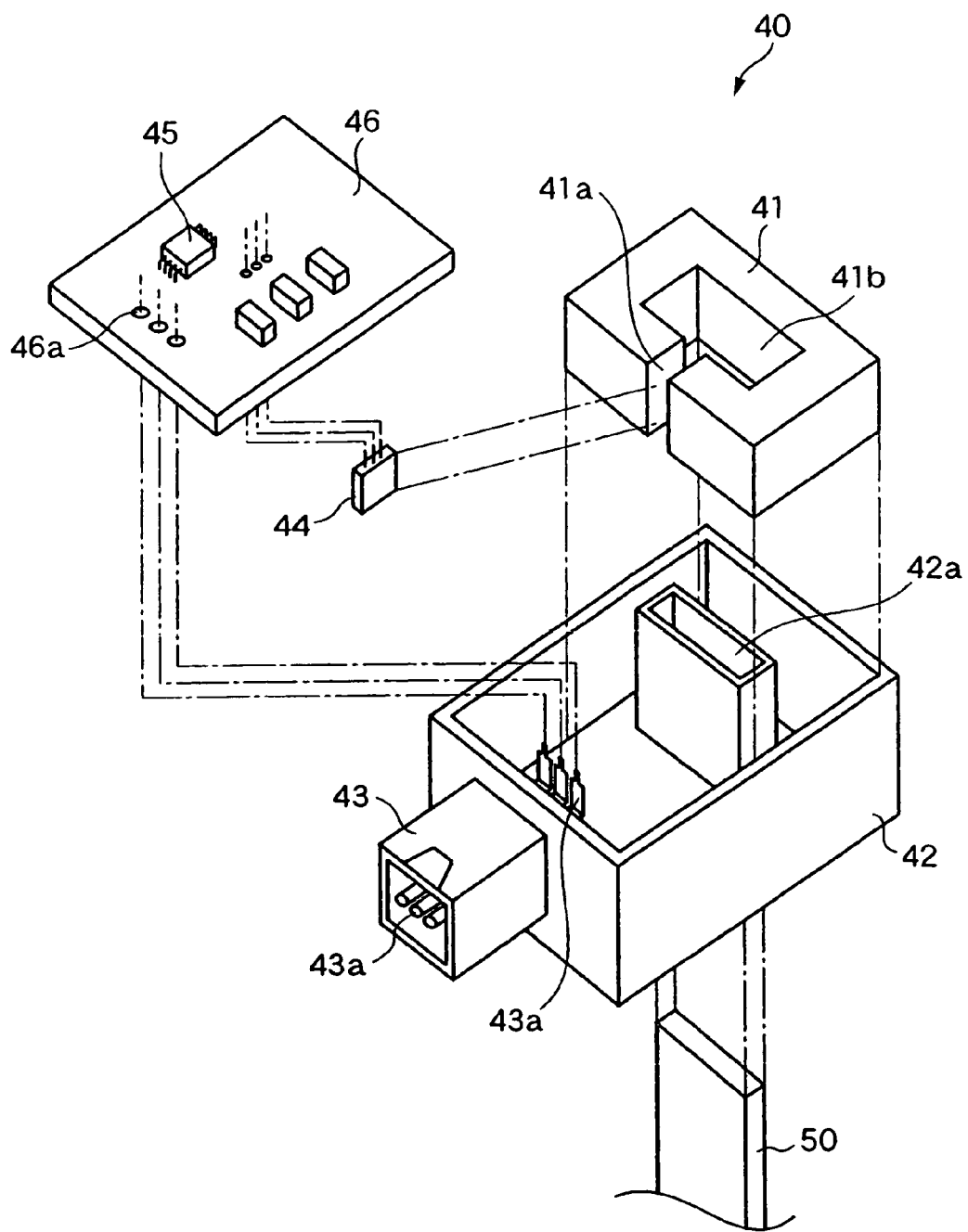
FIG. 4 is an exploded, perspective view another example of a current sensor replacing a current sensor in FIG. 2.
Figure 5:
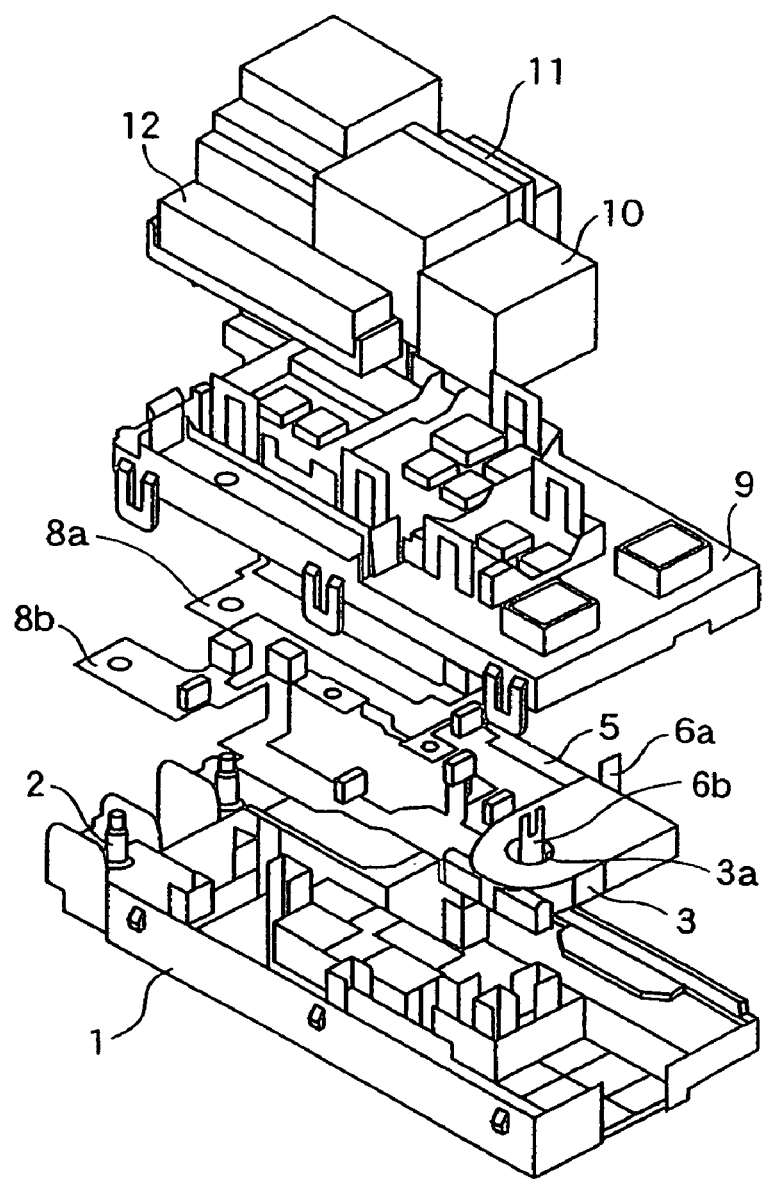
FIG. 5 is an exploded, perspective view of a conventional electric connection box.

For example, instead of the current sensor 33, a current sensor 40 as shown in FIG. 4 can be used. Namely, this current sensor 40 includes a casing 42 made of a thermoplastic resin, and having an insertion portion 42a formed thereon. A core 41 of a C-shape (generally rectangular loop-shape) (which is formed by a plate of a ferrite, silicon steel or the like, and has a hollow portion 41b) is mounted within the casing 42 in such a manner that the hollow portion 41b is fitted on the insertion portion 42a.

An integral connector 43, having input and output terminals 43a, is formed integrally on and projects from one side surface of the casing 42. A magnetoelectric device 44 for detecting magnetic flux to effect magneto-electric conversion is located at a gap portion 41a formed in one side of the core 41. The magnetoelectric device 44 is mounted on a printed circuit board 46 having a circuit 45 for amplifying an output of the magnetoelectric device 44 and land holes 46a. The printed circuit board 46 is fixed or fastened to the casing 42 by screws or the like. The terminals 43a are connected to the land holes 46a of the printed circuit board 46 by soldering or the like.

In order to cancel a variation in sensitivity of the magnetoelectric device 44, a variation in unbalanced voltage and a variation in offset voltage of an operational amplifier used in an amplifier circuit, the constant of a resistor in the circuit 45, provided on the printed circuit board 46, is adjusted. The gap portion 41a of the core 41 has a certain degree of tolerance, and since the sensitivity is varied by an angle of mounting of the magnetoelectric device 44, and in order to deal with variations including this sensitivity variation, an adjustment by means of the variable resistor in the circuit 45 and an adjustment by means of laser trimming are effected.

A molding material (not shown) is filled in the casing 42, and by doing so, the core 41 and the printed circuit board 46 are fixed, and also a waterproof construction is obtained, and besides the core 41 and the printed circuit board 46 have resistance to vibrations.

In the current sensor 40 of this construction, a bus bar 50 is passed through the insertion portion 42a (formed on the casing 42) extending through the hollow portion 41b of the core 41, and an external equipment is connected to the terminals 43a of the connector 43, and with this arrangement a current, flowing through the bus bar 50, is measured. A current sensor of any other suitable structure than that of the current sensor 40 can be applied to the electric connection box of the invention.

The electric connection box 20 of the invention can, of course, be applied not only to an automobile but also to all kinds of vehicles such as a train run by electricity and a train run by steam.

What is claimed is:

1. An electric connection box comprising:
   a lower cover,
   a bus bar mounted on said lower cover;
   an upper cover joined to said lower cover to cover said lower cover; and
   a current sensor provided integrally with said upper cover, wherein said current sensor includes an insertion portion formed to accommodate the bus bar.

2. The electric connection box according to claim 1, wherein said current sensor is set in a mold, and a resin is injected into said mold, so that said upper cover is formed in a state that said current sensor is provided integrally with said upper cover.

3. The electric connection box according to claim 2, wherein said resin is thermoplastic resin.

4. The electric connection box according to claim 2, wherein said resin is thermoset resin.

5. The electric connection box according to claim 1, wherein said lower cover has a hook-like retaining piece portion, and said upper cover has a lock arms for engaging with said retaining piece portion, and said upper cover is joined to said lower cover by engaging said lock arm with said retaining piece portion.

6. The electric connection box according to claim 1, wherein said current sensor further comprises a core, fitted on the insertion portion.

7. The electric connection box according to claim 6, wherein said core of said current sensor has a substantial C-shape.

8. An electric connection box comprising:
   a lower cover on which a bus bar formed of a metal plate is mounted;
   a upper cover which covers said lower cover and on which a current sensor is fixed;
   wherein said current sensor is fixed to said upper cover directly with a resin of which said upper cover is formed, and
   a bent portion formed at one end of said bus bar is inserted into a Hall element of said current sensor.

9. The electric connection box according to claim 8, wherein said upper cover and said lower cover are joined to each other with a fixing mechanism including a lock arm and a retaining piece portion.

10. The electric connection box according to claim 8, wherein said current sensor includes a casing made of a thermoplastic resin on which said Hall element is formed.

11. The electric connection box according to claim 8, wherein said current sensor includes a core having a substantially C-shape, a magnetoelectric device located in a gap portion formed at one end of said core.

12. The electric connection box according to claim 8, wherein said current sensor is set in a mold, and a resin is injected into said mold, so that said upper cover is formed in a state that said current sensor is provided integrally with said upper cover.

13. The electric connection box according to claim 8, wherein said resin is thermoplastic resin.

14. An electric connection box according to claim 8, wherein said resin is thermoset resin.

15. A manufacturing method of an electric connection box, comprising steps of:
   setting a current sensor in a mold;
   injecting a resin into said mold;
   forming an upper cover in a state that said current sensor is provided integrally with said upper cover;
   mounting a bus bar on a lower cover; and
   joining said upper cover with said lower cover and inserting said bus bar into an insertion portion of the current sensor.

16. The manufacturing method of an electric connection box according to claim 15, wherein said resin is thermoplastic resin.

17. The manufacturing method of an electric connection box according to claim 15, wherein said resin is thermoset resin.

18. The manufacturing method of an electric connection box according to claim 15, wherein said lower cover has a hook-like retaining piece portion, and said upper cover has a lock arms for engaging with said retaining piece portion, and said upper cover is joined to said lower cover by engaging said lock arm with said retaining piece portion.

* * * * *